United States Patent
Bickmore et al.

(10) Patent No.: US 9,756,289 B2
(45) Date of Patent: Sep. 5, 2017

(54) UNIQUE WATERMARKING FOR DIGITAL MEDIA

(75) Inventors: Jesse Bickmore, Marina del Rey, CA (US); Fletcher Lee, Knoxville, TN (US); Alex Thurlow, Austin, TX (US)

(73) Assignee: Snowflake Solutions, Inc., Knoxville, TN (US)

( * ) Notice: Subject to any disclaimer, the term of this patent is extended or adjusted under 35 U.S.C. 154(b) by 0 days.

(21) Appl. No.: 13/983,546

(22) PCT Filed: Jan. 30, 2012

(86) PCT No.: PCT/US2012/023121
§ 371 (c)(1),
(2), (4) Date: Dec. 16, 2013

(87) PCT Pub. No.: WO2012/106245
PCT Pub. Date: Aug. 9, 2012

(65) Prior Publication Data
US 2014/0086408 A1    Mar. 27, 2014

Related U.S. Application Data

(60) Provisional application No. 61/439,815, filed on Feb. 4, 2011.

(51) Int. Cl.
*G06F 21/00*    (2013.01)
*H04N 7/167*    (2011.01)
(Continued)

(52) U.S. Cl.
CPC ..... *H04N 7/1675* (2013.01); *H04N 21/42684* (2013.01); *H04N 21/8358* (2013.01)

(58) Field of Classification Search
CPC ............. H04N 7/1675; H04N 21/8358; H04N 21/42684
(Continued)

(56) References Cited

U.S. PATENT DOCUMENTS 6,912,315 B1    6/2005    Wong et al.
7,098,931 B2 *  8/2006    Patterson et al. ............. 345/634
(Continued)

FOREIGN PATENT DOCUMENTS

CN    1928917 A      3/2007
EP    1887513 A2 *  2/2008    ............... G06T 1/00
(Continued)

OTHER PUBLICATIONS

International Search Report Written Opinion for PCT/2012/023121 issued by Korean Intellectual Property Office on Sep. 17, 2012, 11 pages.
(Continued)

*Primary Examiner* — Mahfuzur Rahman
*Assistant Examiner* — Narciso Victoria
(74) *Attorney, Agent, or Firm* — Fish & Richardson P.C.

(57) ABSTRACT

Systems, methods and computer-readable media for uniquely identifying a digital medium by receiving a request for the digital medium, the request corresponding to a requestor, associating a unique identification with the requestor, encoding the digital medium based on the unique identification to provide a watermarked digital medium, the watermarked digital medium including a watermark that can be used to determine the unique identification, and providing the watermarked digital medium to the requestor.

18 Claims, 10 Drawing Sheets

(51) Int. Cl.
*H04N 21/426* (2011.01)
*H04N 21/8358* (2011.01)

(58) Field of Classification Search
USPC .......................................................... 380/210
See application file for complete search history.

(56) References Cited

U.S. PATENT DOCUMENTS

| | | | |
|---|---|---|---|
| 7,636,451 B2 * | 12/2009 | Isogai | 382/100 |
| 8,032,755 B2 * | 10/2011 | Beck et al. | 713/176 |
| 2004/0187005 A1 | 9/2004 | Molaro | |
| 2005/0175179 A1 | 8/2005 | Kesal et al. | |
| 2006/0089912 A1 | 4/2006 | Spagna et al. | |
| 2007/0053438 A1 * | 3/2007 | Boyce et al. | 375/240.24 |
| 2007/0130467 A1 | 6/2007 | Beck et al. | |
| 2009/0193252 A1 | 7/2009 | Wajs | |
| 2012/0045054 A1 * | 2/2012 | Main | H04N 21/23476 380/252 |

FOREIGN PATENT DOCUMENTS

| | | |
|---|---|---|
| JP | H11136618 A | 5/1999 |
| JP | 2005535959 A | 11/2005 |
| JP | 2009545023 A | 12/2009 |
| KR | 2003041501 A | 5/2003 |
| KR | 2005014433 A | 2/2005 |
| KR | 2009079045 A | 7/2009 |
| WO | WO2004015580 A | 2/2004 |
| WO | WO2005004493 A | 1/2005 |
| WO | WO2008026793 A | 3/2008 |

OTHER PUBLICATIONS

Ogor, European Search Report for EP 12742275, Apr. 21, 2015, 7 pages.
Yoshizawa, Examination Report for Japanese Application No. 2013-552570, Nov. 2, 2015, 9 pages.
Examination Report for Chinese Application No. 201280017033.6, Jun. 2, 2016, 19 pages.

* cited by examiner

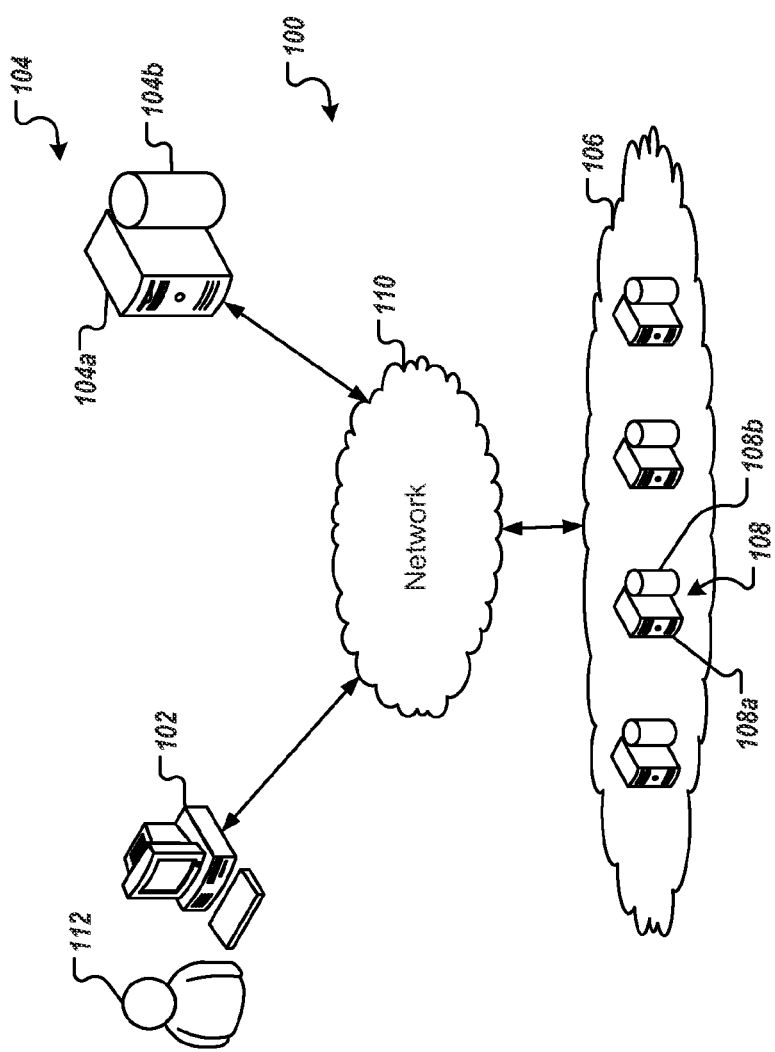

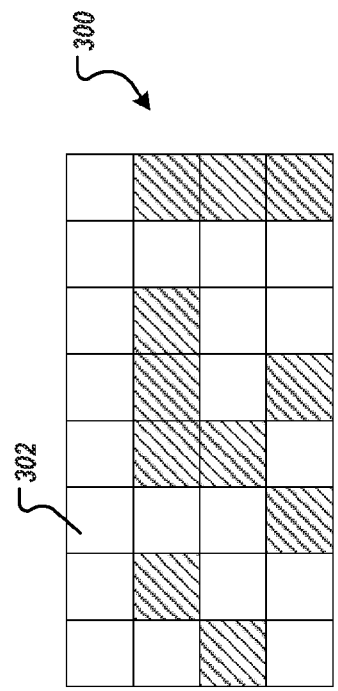

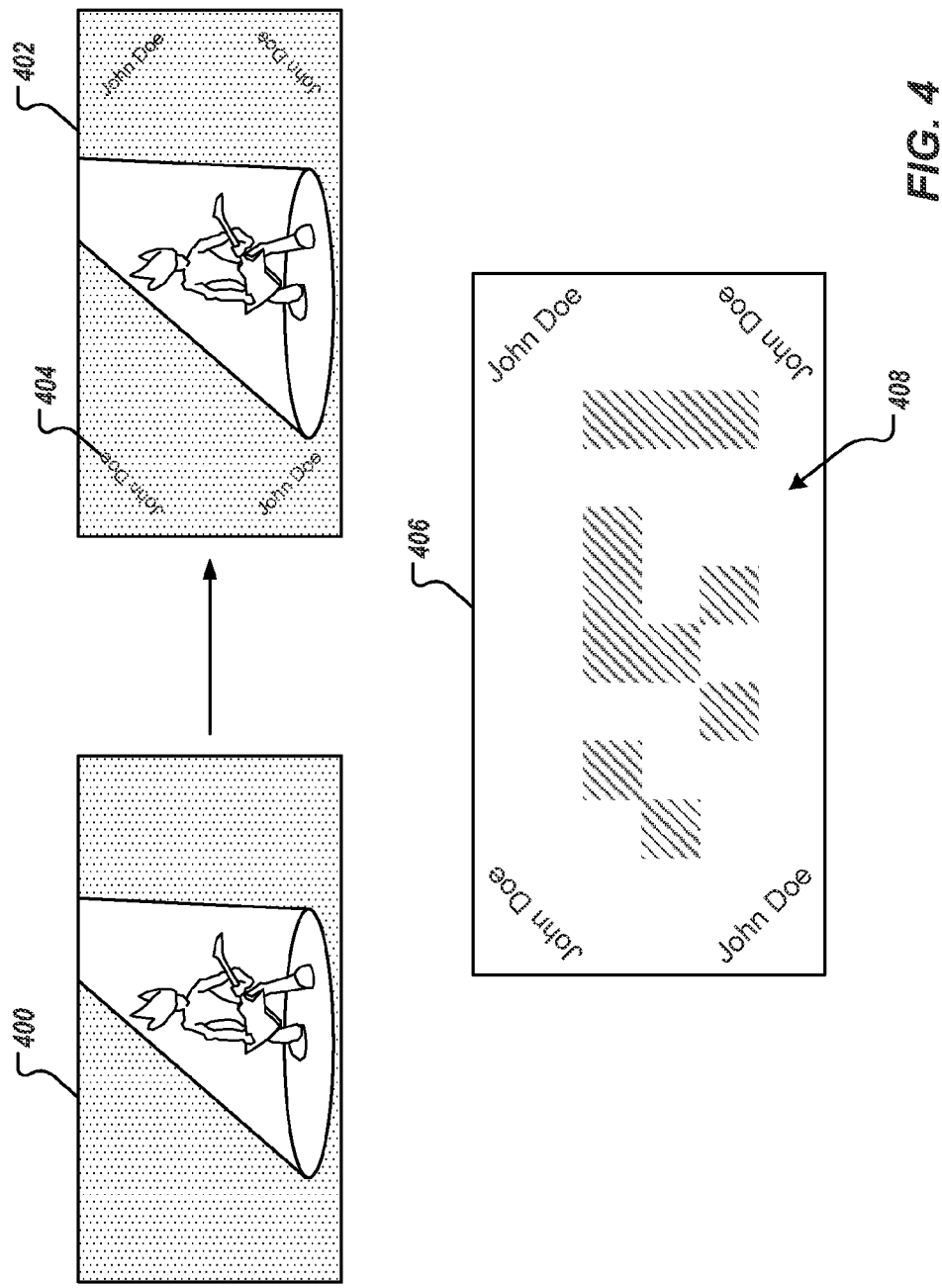

UNIQUE WATERMARKING FOR DIGITAL MEDIA

SUMMARY

Implementations of the present disclosure include computer-implemented methods for uniquely identifying a digital medium. In some implementations, methods include receiving a request for the digital medium, the request corresponding to a requestor, associating a unique identification with the requestor, encoding the digital medium based on the unique identification to provide a watermarked digital medium, the watermarked digital medium including a watermark that can be used to determine the unique identification, and providing the watermarked digital medium to the requestor.

In some implementations, the watermark includes at least one of a visible watermark and an invisible watermark.

In some implementations, methods further include receiving information associated with the requestor, wherein associating the unique identification with the requestor comprises associating the information with the unique identification, and storing the information and the unique identification in a persistent storage device.

In some implementations, the invisible watermark includes a representation of the unique identification.

In some implementations, the unique identification includes one or more of a decimal number, a binary number, a machine-readable code, and one or more symbols.

In some implementations, methods further include selecting the watermarked digital medium from a plurality of watermarked digital media electronically stored in a persistent storage device, the selecting being based on the unique identification. Each watermarked digital medium of the plurality of watermarked digital media includes a unique invisible watermark. Methods further include retrieving the watermarked digital medium from a persistent storage device in response to receiving the request, and determining the unique identification encoded in the watermarked digital medium, wherein the unique identification is associated with the requestor upon determining the unique identification.

In some implementations, encoding occurs in response to receiving the request.

In some implementations, encoding is performed using a server of a cloud computing environment.

In some implementations, the unique ID is encoded based on a seed value. The seed value is a unique seed value that is associated with an original source digital medium that corresponds to the digital medium.

In some implementations, the digital medium includes a digital video including a plurality of frames. The watermark is included in each frame of the plurality of frames. The watermark is included in less than all of the frames than the plurality of frames.

In some implementations, the watermark includes a visible watermark that corresponds to the requestor.

In some implementations, a pattern is associated with the watermark, the pattern corresponding to the unique identification. The pattern includes a plurality of changes to one or more parameters of the watermark. The pattern corresponds to a series of binary digits.

In some implementations, the watermark includes a machine-readable code.

In some implementations, the watermark includes a plurality of watermarks, each watermark of the plurality of watermarks being provided using a respective watermarking method.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

FIG. 1 depicts an example system architecture that can be used to perform implementations of the present disclosure.

FIG. 3A depicts an example portion of a digital medium including a grid and cells.

FIG. 3B depicts an example encoding of the example portion of FIG. 3A.

FIG. 4 depicts example frames of digital medium illustrating visible watermarking and invisible watermarking.

Like reference symbols in the various drawings indicate like elements.

DETAILED DESCRIPTION

Figure 2A:
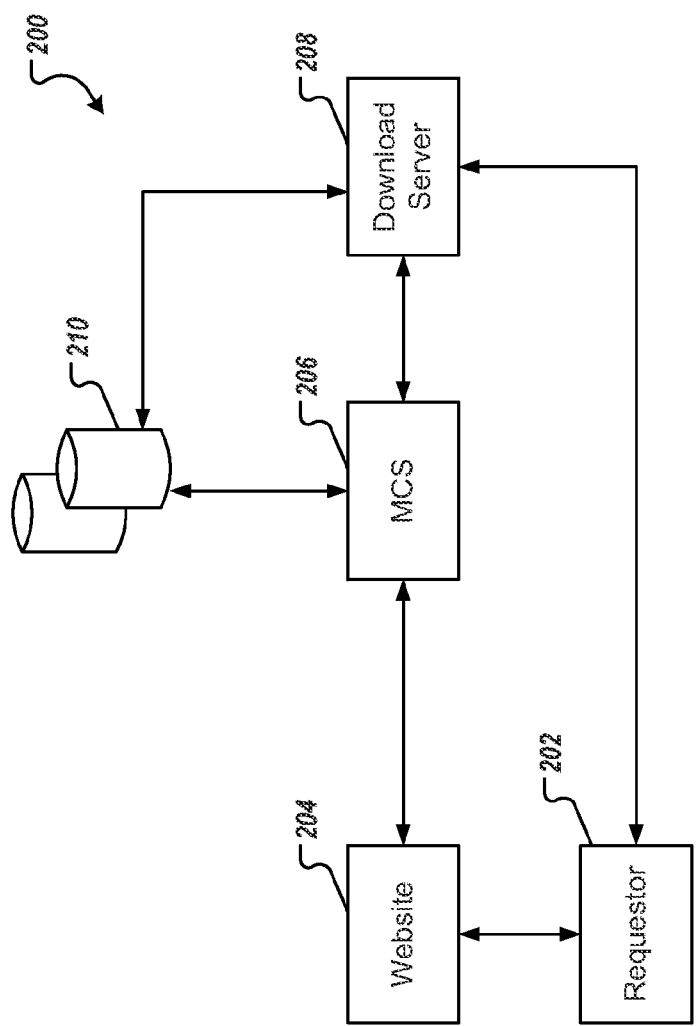
FIG. 2A depicts an example implementation of the present disclosure.

Implementations of the present disclosure are generally directed to uniquely identifying each digital medium of a plurality of distributed digital media. Digital media can include audio, images (e.g., photographs) and video. Digital media can also include a compendium of digital media. For example, a video game, digital encyclopedia or other program can include a plurality of audio, images and/or video. Digital watermarking can be used to identify the owner of a particular digital medium. In digital watermarking, information is encoded into a digital signal in a way that is difficult to remove. Digital watermarking can include visible digital watermarking, in which a watermark is visible in the digital medium. For example, text and/or a logo can be embedded in the digital medium to visibly identify the owner of the media. Digital watermarking can also include invisible digital watermarking, in which a watermark cannot be visibly perceived, or is difficult to visibly perceive in the digital medium. For example, information is added as digital data to the digital medium, but the information cannot be perceived as such.

In accordance with implementations of the present disclosure, a digital medium can be digitally watermarked to identify a requestor (e.g., a purchaser) of the digital medium. The requestor of the digital medium is associated with a unique identification. The digital medium is encoded based on the unique identification to provide a watermarked digital medium. The watermarked digital medium can include a visible watermark and includes an invisible watermark. The visible watermark includes the unique identification and the invisible watermark corresponds to the unique identification. In this manner, the requestor of the digital medium can be identified from subsequent copies of the watermarked digital medium. For example, a copy of the watermarked digital medium can be analyzed to identify the requestor from the visible watermark, if present in the copy, and/or the invisible watermark.

Referring now to FIG. 1, an example system architecture 100 can be used to perform implementations of the present disclosure. The example system architecture 100 includes one or more computing devices 102, one or more server systems 104, and a computing cloud 106 that includes one or more computing systems 108. The example system architecture 100 further includes a network 110. The network 110 can include a large computer network, such as a local area network (LAN), wide area network (WAN), the Internet, a cellular network, one or more wireless access points, or a combination thereof connecting any number of mobile clients, fixed clients, and servers.

The computing device 102 is associated with a user 112. The computing device 102 can include various forms of a processing device including, but not limited to, a desktop computer, a laptop computer, a handheld computer, a personal digital assistant (PDA), a cellular telephone, a network appliance, a smart phone, an enhanced general packet radio service (EGPRS) mobile phone, or a combination of any two or more of these example data processing devices or other data processing devices. The one or more server systems 104 can each include a computing device 104a and computer-readable memory provided as a persistent storage device 104b. The server system 104 can represent various forms of servers including, but not limited to a web server, an application server, a proxy server, a network server, or a server farm. The one or more server systems 104 can each include a computing device 104a and computer-readable memory provided as a persistent storage device 104b. The computing systems 108 each include a computing device 108a and computer-readable memory provided as a persistent storage device 108b, and can represent various forms of server systems including, but not limited to a web server, an application server, a proxy server, a network server, or a server farm.

Referring now to FIG. 2A, an example implementation of the present disclosure will be described. FIG. 2A depicts a functional block diagram of an example system 200 for providing a uniquely identified copy of a digital medium.

The example system 200 includes a requestor 202, a website 204, a master control server (MCS) 206, a download server 208 and one or more persistent storage devices 210. The requestor 202 can include a user of a computing device (e.g., the computing device 102 associated with the user 112 of FIG. 1). The website 204 can include a website that is hosted using one or more server systems (e.g., the server system 104 of FIG. 1). The MCS 206 can include a server system (e.g., the server system 104 or the computing systems 108 of FIG. 1). The download server can include a server system (e.g., the server system 104 or the computing systems 108 of FIG. 1). The one or more persistent storage devices 210 can include computer-readable memory (e.g., the persistent storage device 104b or the persistent storage device 108b of FIG. 1). The requestor 202, the website 204, the MCS 206, the download server 208 and the one or more persistent storage devices 210 can communicate over one or more communication channels (e.g., the network 110 of FIG. 1).

The website 204 can be provided by an entity that distributes digital media. For example, the website can be provided by an entity that advertises and sells digital media to customers. An example customer can include the requestor 202. In operation, the requestor can access the website 204 using a graphical user interface (GUI) (e.g., a web browser) executed using a computing device (e.g., the computing device 102 of FIG. 1). In some implementations, an application programming interface (API) can be used to request digital media in a more automated manner. In this manner, a business partner can utilize core watermarking services, as discussed herein, and can provide their own GUI. The requestor 202 can browse and initiate purchases of digital media through the website 204. For example, the requestor 202 can select a particular digital medium to purchase and can initiate the purchase by providing information to the website. The information can include, for example, a name, an email address, a billing address, a shipping address, and payment information (e.g., credit card information). In some implementations, the information can be stored in a profile that is associated with the requestor 202.

Once a request has been received and approved (e.g., the billing information has been verified), a copy of the digital medium is prepared to be provided to the requestor 202. In some implementations, the website 204 sends a request, or order to the MCS 206. The request can include, for example, a source medium identifier (source medium ID), requestor information, notification method, quality (e.g., standard definition (SD), high definition (HD)) and/or codec type (e.g., H.264). The source medium ID indicates the original source medium that the requestor has requested. For example, in the case where the requestor is a purchaser of a particular digital video, the source medium ID identifies the original source digital video. The requestor information can include information that is unique to the particular requestor. For example, the requestor information can include an email address and/or a customer identifier (customer ID) associated with the particular requestor. In the case of API access, the to be watermarked digital medium can be provided as an input. For example, a user, who is not the end-user who requested the digital medium, can provide the digital medium that is to be watermarked. An example user can include a business partner that is leveraging digital watermarking services for digital media that they distribute.

The MCS 206 associates the requestor information with a unique identification (unique ID). The unique ID is selected from a list of available unique IDs. The unique ID can be mapped to a random key such that hyperlinks to encoded copies cannot be guessed by piraters. In some implementations, the unique ID can include a decimal number that corresponds to an n-bit binary number, where n is an integer greater than 0. In an example implementation, n is equal to 24. In another example implementation, n is equal to 32. For purposes of illustration only, 32-bit binary numbers will be discussed, which provide approximately four billion unique IDs that can be included in the list of available unique IDs. The requestor information and the unique ID are stored (e.g., in the persistent storage devices 210). In general, the unique ID can be provided in any numerical and/or non-numerical format (e.g., decimal, binary, hexadecimal, base 8, text).

In the example implementation of FIG. 2A, the unique ID can correspond to a particular watermarked digital medium of a plurality of watermarked digital media stored in the persistent storage device 210. In this sense, the plurality of watermarked digital media defines an inventory of available watermarked digital media. Each watermarked digital medium of the plurality of watermarked digital media is provided as a unique copy of an original source medium that is identified using the source medium ID, and is watermarked based on the unique ID. The particular watermarked digital medium (corresponding to the unique ID) is provided to the requestor. In some implementations, the particular watermarked digital medium is provided to the download server 208, from which the requestor 202 can download the particular watermarked digital medium. For example, a notification can be sent to the requestor (e.g., via email). The notification can include a uniform resource indicator (URI), such as a uniform resource locator (URL), that the requestor can use to access and download the particular watermarked digital medium. In some implementations, the particular watermarked digital medium can be copied to a storage device (e.g., a memory card, a CD, a DVD) that can be mailed to the requestor. For example, the particular watermarked digital medium can be provided to a creation service (not illustrated) that copies the particular watermarked digital medium can be copied to a storage device. The particular manner used to notify the user of the availability of and provide the user access to the particular watermarked digital medium can be based on the notification method provided to the MCS 206, discussed above.

Figure 2B:
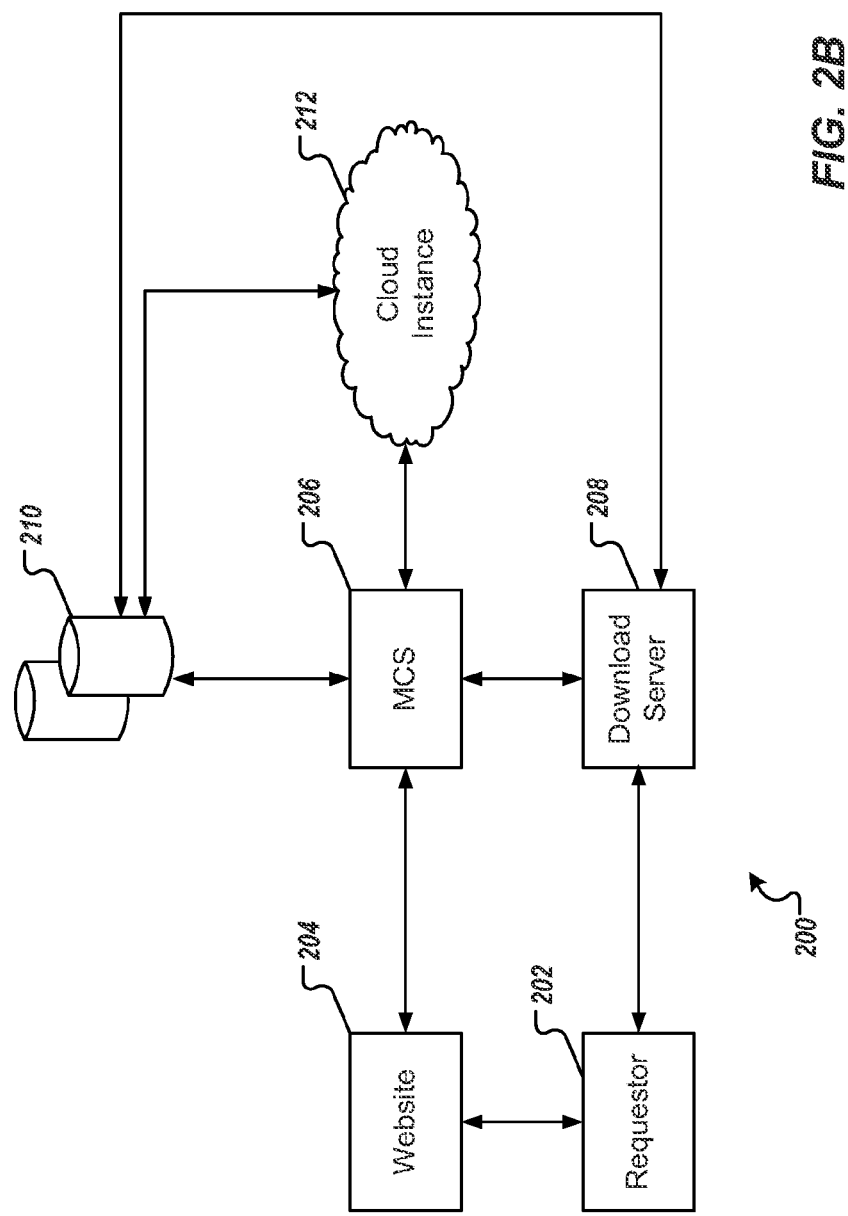
FIG. 2B depicts another example implementation of the present disclosure.

Referring now to FIG. 2B, another example implementation of the present disclosure will be described. FIG. 2B depicts a functional block diagram of the example system 200 for providing a uniquely identified copy of a digital medium. The example system 200 includes the requestor 202, the website 204, the MCS 206, the download server 208, the one or more persistent storage devices 210, and a cloud instance 212. In some implementations, the cloud instance 212 is provided as a process that can be executed using one or more computing devices (e.g., the MCS 206 and/or the computing systems 108 of FIG. 1). As discussed in further detail herein, the cloud instance 212 can process an original source medium to generate the plurality of watermarked digital media stored in the persistent storage device 210 and/or to generate a watermarked digital medium on-the-fly (i.e., on a per order basis, and/or when the inventory of the plurality of watermarked digital media is exhausted).

In the example implementation of FIG. 2B, the MCS 206 determines whether the original source medium has been uploaded to the persistent storage devices 210. If the original source medium has not been uploaded to the persistent storage devices 210, the MCS initiates upload of the original source medium to the persistent storage devices 210. This prevents the original source medium from being fully uploaded on each unique request and reduces bandwidth requirements. If the original source medium is available on the persistent storage devices 210, the MCS 206 instantiates the cloud instance 212 using a custom operating system (OS) image that can be pre-loaded with the watermarking software. The cloud instance 212 communicates with the MCS 206 to determine which digital medium to encode and parameters for watermarking parameters. The MCS 206 determines the unique ID to be assigned to the particular digital medium being encoded and which an invisible watermark is to be based on. The MCS 206 stores the unique ID and the associated requestor information in the persistent storage device 210.

The cloud instance 212 downloads the corresponding original source digital medium (based on the source medium ID) from the persistent storage devices 210 to local storage for encoding. The cloud instance 212 processes the original source medium and communicates with the MCS 206, as necessary, to retrieve watermarking parameters. In some implementations, the processing includes re-encoding the original source medium at a compressed bit-rate, applying the invisible watermark, and optionally applying the visible watermark in an encoding step to produce a copy of the original source medium provided as a watermarked digital medium. As discussed in further detail herein, the invisible watermark corresponds to the unique ID assigned to the particular requestor. The watermarked digital medium is transferred from the cloud instance 212 to the persistent storage devices 210, or is otherwise made available for access by the requestor 202. The cloud instance 212 can either shut down or can communicate with the MCS 206 to determine whether another source medium is pending processing.

In some implementations, metadata can be appended to the watermarked digital copy. For example, metadata including information associated with the requestor and/or the unique ID can be appended to the watermarked digital copy. In some cases, a pirater of the particular digital media may fail to re-encode or otherwise remove the metadata. In such cases, the requestor and/or the unique ID can be determined directly from the metadata without further analysis of any visible watermarks and/or invisible watermarks.

Referring now to FIGS. 3A-4, example watermarking processes in accordance with implementations of the present disclosure will be described. For purposes of illustration, the digital medium is provided as a digital video. A master copy provided as an original source digital video is stored to and accessible from a persistent storage device (e.g., the persistent storage devices 210 of FIGS. 2A and 2B). The master copy can be provided as a high quality and un-watermarked copy of the original source digital video. The original source digital video is copied to the encoding cloud instance (e.g., the cloud instance 212 of FIG. 2B). The cloud instance invokes watermarking software to perform several tasks. The cloud instance re-encodes the digital video at a compressed variable bit-rate. In this manner, the file size can be reduced while maintaining video quality (e.g, HD). The re-encoding can utilize the H.264 codec with custom presets designed to balance performance and encoding time with acceptable quality levels. The cloud instance applies a unique ID as an invisible watermark. The unique ID can be used to identify who a particular copy of the digital video belongs to, as discussed in further detail below. The cloud instance optionally applies a visible watermark. The visible watermark can be provided as text and/or a logo that is visible in the video. In some implementations, the invisible watermark is provided as an optional watermark.

The visible watermark provides a warning to the owner (e.g., the requestor 202 of FIGS. 2A and 2B) that their copy is unique and protected by copyright. In this manner, the visible watermark is an initial deterrent against piracy (i.e., illegal copying and distribution of the digital video). In some implementations, the visible watermark can be semi-transparent to reduce any visual impact on the source video. The text and/or logo for this visible watermark can be customizable. For example, the visible watermark can include the requestor's name, email address, customer ID, and/or any other information that is unique to the particular requestor. Behavior of the visible watermark can be specified. For example, the visible watermark can be added to all frames of the digital video, can be added to less than all of the frames of the digital video, and can fade in and out of the video. Furthermore, to make concealing or covering of the visible watermark more difficult, the visible watermark can randomly appear in different positions within the digital video (e.g., different corners at different times), and/or can scroll across the digital video. In implementations where visible watermarks are provided on-the-fly (e.g., the example implementation of FIG. 2A), one or more of these options can be provided in any combination. In implementations where an inventory of watermarked digital videos have been pre-encoded (e.g., the example implementation of FIG. 2B), the choice of text may be limited, because the requestor information may not be known. Consequently, a placeholder customer ID (e.g., corresponding to the unique ID) can be applied, which customer ID is later associated with the requestor and the unique ID and is stored in persistent storage.

In some implementations, visible watermarks can be added and/or varied in timed locations within the digital video, where the timed locations vary per requestor. For example, the timing of when and where the visible watermark appears can be randomized. The timings can be measured from both the time from the beginning and the intervals between each timed visible watermark. In this manner, the particular pattern of time and location can be associated with the requestor and can provide measure for identifying which requestor a particular copy of the digital video came from. For example, a visible watermark in a digital copy (of a master digital video) corresponding to a first requestor can intermittently appear in the top right corner of the digital video every 5 seconds. A visible watermark in another digital copy (of the same master digital video) corresponding to a second requestor can intermittently appear in the top left corner of the digital video every 7 seconds. If a copy of the video is found to be illegally distributed, and the copy includes a visible watermark that intermittently appears in the top left corner of the digital video every 7 seconds, it can be determined that the illegally distributed copy originated from the second requestor. In some implementations, a time-based code can be provided, which time-based code is unique to a particular unique ID. For example, a unique ID can correspond to a time-based watermarking code, where a visible watermark and/or invisible watermark is present in the digital media at 00:35, 01:23, 02:55, 05:12, provided in minutes and seconds (e.g., MM:SS).

The invisible watermark is provided as a secret, unique ID that is embedded as n-bits in one or more frames of the digital video. In some implementations, the unique identifier is embedded in every frame of the digital video. In some implementations, the unique identifier is embedded in less than every frame of the digital video. There is a trade-off between the number of bits that can be stored in each frame and the redundancy/robustness of the information and its survival against attacks. As noted above, implementations of the present disclosure can use between 24 and 32 bits, which allows for between approximately 16 million (i.e., $2^{24}$) and 4 billion (i.e., $2^{32}$) unique IDs to be distinguished per digital video. For example, 4 billion copies of a particular digital video can be created, each copy having a unique invisible watermark that is proved based on the unique ID. It is appreciated that these values are example values and can vary. The unique IDs are generated on a per digital video basis and are stored in a database along with an associated requestor ID, the requestor ID being unique to a particular requestor. The unique IDs can be selected in a deliberately random manner per copy of the digital video. This can assist in accurately identifying a probable unique ID when an exact unique ID match is not found, as discussed in further detail below.

The unique ID is encoded into one or more frames of the digital video. In some implementations, the unique ID is encoded into each frame of the digital video. In this manner, if clips of the video are cut out the requestor associated with the unique ID can still be identified. In some implementations, and to defend against cropping attacks, the unique ID is redundantly encoded in several grids divided over the surface of each frame. An example of this is discussed in further detail below. Redundant encoding of the unique ID enables the unique ID to be extracted even when portions, such as edges, of the digital video are cropped out. In some implementations, and to defend against rescaling or re-sampling of the video, the message bits making up the encoded unique ID are tiled into larger blocks to provide another layer of redundancy.

The particular algorithm for producing the invisible watermark can vary. In some implementations, the watermarking algorithm can be based on spread spectrum steganography. Such watermarking algorithms encodes the unique ID as pseudo-random distributed Gaussian noise applied over the image, which in the example case, is one or more frames of a digital video. In plain language, the encoded unique ID appears as random noise introduced into the frame at such a level as to be imperceptible or almost imperceptible to the human eye. The noise can be applied to the spatial domain by adjusting the RGB values of particular pixels, or pixel blocks. In order to reduce perceptibility of the applied watermark, which is generally only noticeable when comparing a watermarked copy with the original source, RGB values can be adjusted in order of luminosity. When applying the watermark to each pixel block, the variance of the pixels in each block is computed and the degree of gain of the watermark is scaled relative to the variance. In this manner, smooth areas in the frame do not result in any visible blockiness, or pixelation.

In encoding the invisible watermark, a seed value is used to generate the pseudo-random noise in which the unique ID is encoded. In order to extract the unique ID from a watermarked copy of the digital video, the seed value must be known. A unique seed value is generated (e.g., by the MCS 206 of FIGS. 2A and 2B) for each unique source video. The seed value is associated with the original, source video and is stored. To extract the invisible watermark from the copy of the digital video, the seed value must be known. Consequently, third parties are unable to extract the invisible watermark even if they know how the algorithm works. In general, the parameters for the invisible watermark are selected such that the unique ID can still be extracted from the copy of the digital video, even if the copy of the digital video has been re-compressed, resized, cropped and/or clipped.

The seed value can be provided as random number that is applied to a binary number corresponding to the unique ID to further randomize the binary number. In this manner, a string of 0's in the unique ID, for example, would result in random variations when applied as a watermark, which can only be extracted when the random seed value is known. This also helps to create more Gaussian and random noise that is not as perceptible. The seed value can be input into a random number generator, which generates a binary sequence of 0's and 1's. The same seed value will result in the same sequence of 0's and 1's.

In some implementations, the invisible watermark can include one or more parameters within the digital media that can vary based on a pattern, where the pattern is unique to a particular copy of the digital media and can be used to determine the unique ID. For example, the types and parameters of watermarks applied to each digital media can be unique to a particular copy of the digital media. For example, and considering a visible watermark, a pattern that corresponds to a unique ID can include intermittent changes to a location of the visible watermark within the digital media, intermittent changes in one or more colors of the visible watermark, movement (e.g., rotation) of the visible watermark, and/or intermittent appearance of the visible watermark. As another example, and considering an invisible watermark, a pattern that corresponds to a unique ID can include intermittent changes to a location of the invisible watermark within the digital media, movement (e.g., rotation) of the invisible watermark, and/or intermittent application of the invisible watermark within the copy of the digital media. The changes in one or more of such parameters of the visible watermark and/or the invisible watermark can correspond to a unique pattern. The unique pattern can correspond to the unique ID or the source medium. In general, any pattern corresponding to changes in color, size, shape, font, or any other parameter of the visible watermark and/or invisible watermark can be implemented.

Referring now to FIGS. 3A and 3B, an example portion 300 of a frame of the digital video can be divided into a number of cells 302 based on a grid 304. Each cell 302 represents a pixel block and can have a position number associated therewith. It is appreciated that the cells 302 of FIG. 3A do not have to be tiled as illustrated. Instead, for example, the cells 302 can be positioned in a random and/or spaced out manner such that the cells or at least a sub-set of cells 302 do not evenly align. In the example provided herein, 32 cells 302 are provided, corresponding to a 32-bit unique ID, as discussed in further detail herein. The unique ID can be based on a seed value and a requestor ID, as also discussed in further detail herein. An example unique ID of 6132009 can be provided as a decimal number. This example unique ID can be converted to the 23-bit binary number 10111011001000100101001. In the example implementation, a 32-bit number is desired. Consequently, additional zero bits can be added to the 23-bit binary number to provide the 32-bit binary number 00000000010111011001000100101001.

The portion 300 of the frame can be encoded with the example 32-bit binary number by selectively altering the video within particular cells, as discussed herein. For example, to encode the 1's of the example 32-bit binary number, cell numbers 1, 4, 6, 9, 13, 16, 17, 19-21 and 23 are altered to provide the pattern depicted in FIG. 3B. To encode the 0's of the example 32-bit binary number, cell numbers 2, 3, 5, 7, 8, 10-12, 14, 15, 18, 22 and 24-32 are not altered, or are altered in an inverted manner. It is appreciated that other implementation can include 0's being encoded by altering corresponding cells and leaving other cells not altered to encode 1's. Subsequent analysis of the resultant pattern can be used to determine the unique ID represented by the pattern and the particular requestor associated with the unique ID, as discussed in further detail herein. It is further appreciated that once the seed value has been applied, a 32-bit unique ID will not necessarily map to 32 cells as depicted. Instead, the unique ID can be mapped to many more cells (e.g., depending on the size of the space being covered), where multiple cells would correspond to one bit of the 32-bit unique ID.

With particular reference to FIG. 4, a frame 400 of an original, source digital video can be encoded to provide a corresponding watermarked frame 402. In the example of FIG. 4, the watermarked frame 402 includes visible watermarks 404 in each of the corners as well as an invisible watermark. The example visible watermarks 404 include the name John Doe, which corresponds to the name of the particular requestor that purchased, or otherwise legally obtained the watermarked digital video. It is appreciated, however, that the visible watermarks 404 can include other information that may be unique to the particular requestor, as discussed above. The invisible watermark is not visually perceivable in the watermarked frame 402.

For purposes of illustration, FIG. 4 further depicts a difference frame 406. The difference frame 406 depicts the difference between the original frame 400 and the watermarked frame 402. Consequently, the difference frame 406 includes the visible watermarks 404 and also includes an invisible watermark 408. It is appreciated that the invisible watermark 408 may or may not be humanly perceivable in an actual difference frame, and is exaggerated in the example difference frame 406 of FIG. 4 for purposes of discussion and illustration. In any case, the invisible watermark 408 is machine perceivable (i.e., the difference frame 406 can be processed using software executed on one or more computing devices to perceive the invisible watermark 408).

In the example of FIG. 4, the invisible watermark 408 includes the encoding pattern of FIG. 3B. In some implementations, the invisible watermark can include a repetition of an encoding pattern. For example, an invisible watermark can include n (where n=1, 2, 3, . . . ) encoding patterns repeated in a shaped or random arrangement. For example, the frame 406 can be divided into a grid having a plurality of rows and a plurality of columns to provide a plurality of cells. The cells can be selectively occupied with the encoding pattern. Any one of the multiple encoding patterns can be used to determine the corresponding unique ID, which ultimately corresponds to the original requestor (e.g., John Doe). Consequently, if all four edges of the digital video had been cropped, the center encoding pattern would remain fully intact for determining the corresponding unique ID. The arrangement of the multiple encoding patterns can be provided in various manners. Generally, the visible watermark and the invisible watermark do not overlap. In some implementations, the invisible watermark can change from frame-to-frame in the watermarked digital video. For example, in one or more frames of the watermarked digital video, the invisible watermark can be provided in a first shaped arrangement. In one or more other frames of the watermarked digital video, the invisible watermark can be provided in a second shaped arrangement that is different from the first shaped arrangement.

In some implementations, the location of the invisible watermark can vary based on the content of the individual frames. For example, during the encoding process a to be invisible watermarked frame can be analyzed to determine one or more locations for encoding patterns. A candidate location can be determined based on the content of the digital video within the particular location. For example, some content, such as a very dark feature (e.g., a black wall, or dark background), may make an invisible watermark less perceptible by the human eye. Consequently, an encoding pattern can be applied in such locations. Further, analysis of the picture frame can be used to adjust the strength of the watermark to reduce perceptibility. For example, in certain frames where the background is mostly a solid color or gradient, the watermark strength can be reduced adaptively to avoid visible distortions.

In some implementations, unique IDs can be selected based on the number of 1-bits or 0-bits in the corresponding binary number. For example, and in the case where 1-bits are encoded, binary numbers having fewer 1-bits than 0-bits can be selected. In such cases, and using a 32-bit unique ID as an example, only unique IDs having 16 or less 1-bits are used (i.e., one half of 32-bits). In this manner, unique IDs can be selected such that their binary representations are maximally different. This can help in the detection phase, discussed in further detail below, where an exact match may not be found. In such an instance, the binary similarity between known unique IDs can be computed and there is less chance of having two similar results, if the unique IDs are selected in this manner, as opposed to incremental selection.

In some implementations, unique IDs can be selected based on the number of consecutive common bits in the corresponding binary number. In such implementations, binary numbers having strings of less than a threshold number of common bits are used. An example threshold can include 4-bit strings. For example, only unique IDs having less than 4-bit long strings of 1's or 0's are used. By way of non-limiting example, the unique ID of 00000000000000001111111111111111 in binary would not be used, because it includes a string of sixteen 0's and a string of sixteen 1's. The unique ID of 00011100011100011100011100011100 could be used, because it includes only fifteen 1-bits and none of the strings of consecutive common bits is equal to or greater than 4-bits.

In some implementations, and with reference to the discussion above with regard to the seed value, the size of portions of the random seed value increases when less bits are encoded. For example, the unique ID can be provided as 0101 (4 bits) in binary and can be encoded over 32 cells of a grid (e.g., FIG. 3A). The number of cells can be divided by the bits within the unique ID (e.g., 4 bits) to get 8. For each bit in the unique ID, the random seed value is used such that the 0's in 0101 correspond to a pseudo-random value of 8 bits long, such as 01001010, and the 1's of 0101 correspond to a different pseudo-random string, such as 10011011. In this manner, the unique ID that is actually encoded (encoded unique ID) includes the binary number 01001010100110110100101010011011. During detection/decoding, discussed in further detail below, the random seed value is used to generate the pseudo-random sequences and extract the unique ID 0101 from the longer, encoded unique ID. In some implementations, each 0 in the unique ID (e.g., 0101) can correspond to a different pseudo-random string, and/or each 1 in the unique ID (e.g., 0101) can correspond to a different pseudo-random string. As discussed above, the placement of the cells can be evenly tiled, as illustrated, or can be arbitrary (e.g., randomly, unevenly aligned).

In some implementations, the digital media can be split into a plurality of segments. The presence of a visible watermark and/or an invisible watermark can correspond to a number (e.g., 0 or 1). A pattern of the presence of the visible watermark and/or the invisible watermark in a series of segments can correspond to the unique ID. For example, a visible watermark and/or an invisible watermark is provided in a first segment of the digital media. Consequently, the first segment corresponds to a 1. The visible watermark and/or the invisible watermark is absent from a second segment of the digital media. Consequently, the second segment corresponds to a 0. Accordingly, the first and second segments provide a portion (e.g., 10) of the unique ID. Subsequent segments can include, not include, or vary the visible watermark and/or invisible watermark between states to provide the remaining portion of the unique ID.

In some implementations, the time over which the visible watermark and/or invisible watermark is present in a particular segment or timeframe can be used to determine the unique ID. For example, the presence of the visible watermark and/or invisible watermark for X seconds corresponds to a binary digit (e.g., 1) of the unique ID. The presence of the visible watermark and/or invisible watermark for Y seconds (where X≠Y) corresponds to another binary digit (e.g., 0) of the unique ID. A pattern of binary digits can be determined, which pattern defines the unique ID.

In some implementations, a segment of the digital media can have a predetermined duration (e.g., 60 seconds). The length of the segment can divided by the number of bits a binary number that corresponds to the unique ID to provide a plurality of sub-intervals. Each sub-interval can correspond to a bit of the binary number. For a given sub-interval, the presence or absence of the visible watermark and/or invisible watermark can correspond to a binary digit (e.g., 0, 1). In this manner, a unique variation of fading in/out for each copy of the digital media can be produced, in which the binary number can be extracted. This can be repeated over the entire length of the digital media to add redundancy and fight against cropping. To reduce the visual impact of changes, a visible watermark can be faded in/out slightly (to correspond with each 0 or 1) and can be made not entirely visible/invisible.

In some implementations, variable positions of the visible watermark and/or invisible watermark can be used to determine the unique ID. For example, and considering the visible watermark, the presence of the visible watermark in the top right corner of a first frame represents the binary digit 0. The presence of the visible watermark in the bottom right corner of a second frame represents the binary digit 1. Subsequent frames can include the visible watermark to collectively indicate a string of binary digits that define the unique ID.

With regard to visible watermarks, a visible watermark does not need to be unique in and of itself. For example, the visible watermark can include a static name of a person or entity (e.g., band) that is present in the digital media, a logo and/or name of a distribution company that distributes the digital media, and/or a random shape. The presence or absence of the visible watermark within the digital media can be manipulated in accordance with one or more of the implementations described herein in a pattern that corresponds to a unique ID. In this manner, the visible watermark can still be used to determine the unique ID of a particular copy of the digital media, although the visible watermark is not itself unique across copies of the digital media.

In some implementations, the visible watermark and the invisible watermark can include machine-readable code. Example machine-readable codes include, but are not limited to, bar codes and QR code. The machine-readable codes can be processed to determine the unique ID. For example, and with reference to FIG. 4, instead of the text "John Doe," the visible watermark 404 can be provided as a machine-readable code that corresponds to the unique ID. As another example, and with continued reference to FIG. 4, instead of the binary pattern discussed in FIG. 3, the invisible watermark 408 can be provided as a machine-readable code that corresponds to the unique ID.

In order to identify which requestor corresponds to a particular copy of a digital video, a combination of automated and manual techniques can be applied. A suspect video can be downloaded to a computing device for analysis. For example, a copy of a digital video having the visible watermark removed, or otherwise being distorted can be posted to a website for public consumption. The copyright owner of the original source video can recognize the particular copy as one to which they own the copyright to, and perhaps have sold one or more watermarked copies of. A detection service executing using the computing device can accept the suspect video for analysis (e.g., using an API), and can notify the copyright owner when processing is completed.

Automated techniques can be applied to the suspect video. If the automated techniques do not produce a result of sufficient confidence, manual techniques can be applied. In this manner, the amount of human intervention needed for identifying requestors associated with copies of digital videos can be reduced. The automated techniques include extracting the visible watermark and/or invisible watermark as discussed in further detail herein.

To identify the requestor associated with a particular copy of a digital video, it is first determined whether the visible watermark is present. If the visible watermark is present, information contained in visible watermark is cross-referenced with information stored in the MCS database to determine which requestor the copy of the digital video was created for. If the visible watermark has been removed or is otherwise not recoverable from the copy, the unique ID is extracted from the invisible watermark. The unique ID can be processed to determine which requestor the copy of the digital video was created for. If the unique ID is not extractable using automated detection, the copy of the digital video was most likely modified (e.g., cropped and/or clipped). An administrator can compare the copy with the original source video determine the offsets, and then feed this information into the automated detection routine for a second pass.

The automated detection compares each frame in the watermarked copy with the original source frame. Frame time stamps can be directly correlated to compensate for any frame rate changes in the modified copy. The original video frame is subtracted from the watermarked copy, to provide a difference frame (e.g., difference frame 4406 of FIG. 4), which provides the underlying Gaussian noise. The unique ID can be determined from one or more of the encoding patterns that make up the Gaussian noise. Using the seed value for the particular digital video, the requestor ID associated with the particular requestor can be determined. In some implementations, a filter can be applied to the watermarked copy to provide a filtered watermarked copy. The filtered watermarked copy can be used to determine the unique ID.

The results of the correlation algorithm are summed up for all frames to determine a running probability of what the unique ID is from the frames processed. The sum converges on the correct unique ID after processing a sufficient number of frames. This adds a layer of robustness in that the entire unique ID might not be able to be extracted from each frame, but the more frames that are processed, the more likely it is able to determine the unique ID. In some implementations, even if a copy of the digital video is compressed or reduced in size (e.g., by factors of ¼ or even ⅛), the unique ID can be extracted given a sufficient number of frames.

In some implementations, if the unique ID cannot be fully extracted with sufficient confidence, the "most likely" extracted bits can be compared to the MCS database to at least determine the most likely matches. For example, the percentage of bits of a determined ID that are in common with various unique IDs stored in the database for a particular video can be determined. If the percentage of bits exceeds a threshold for a given unique ID, the determined ID can be said to correspond to the unique ID. For example, if 90% of the bits of a determined ID correspond to a particular unique ID stored in the database, and less than 90% of the bits of the determined ID correspond to any other unique ID stored in the database, the determined ID can be said to correspond to the particular unique ID.

Figure 5A:
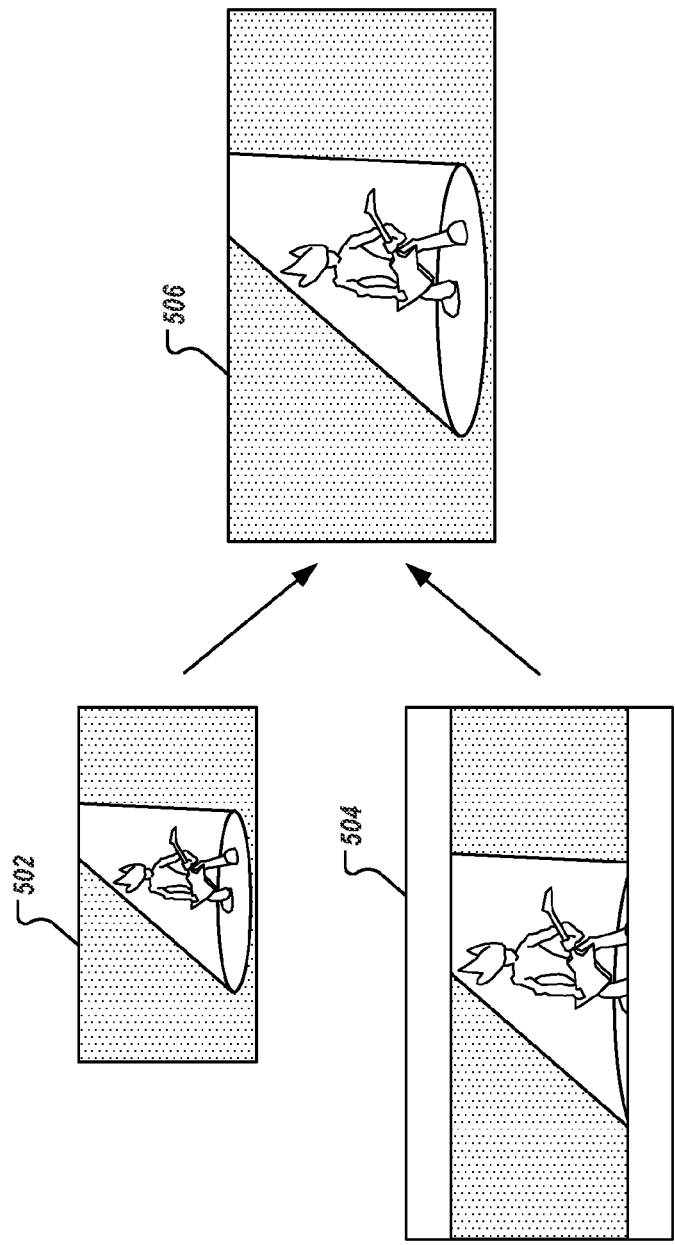
FIGS. 5A-5B depict example frames for determining unique identifications in accordance with implementations of the present disclosure.
Figure 5B:
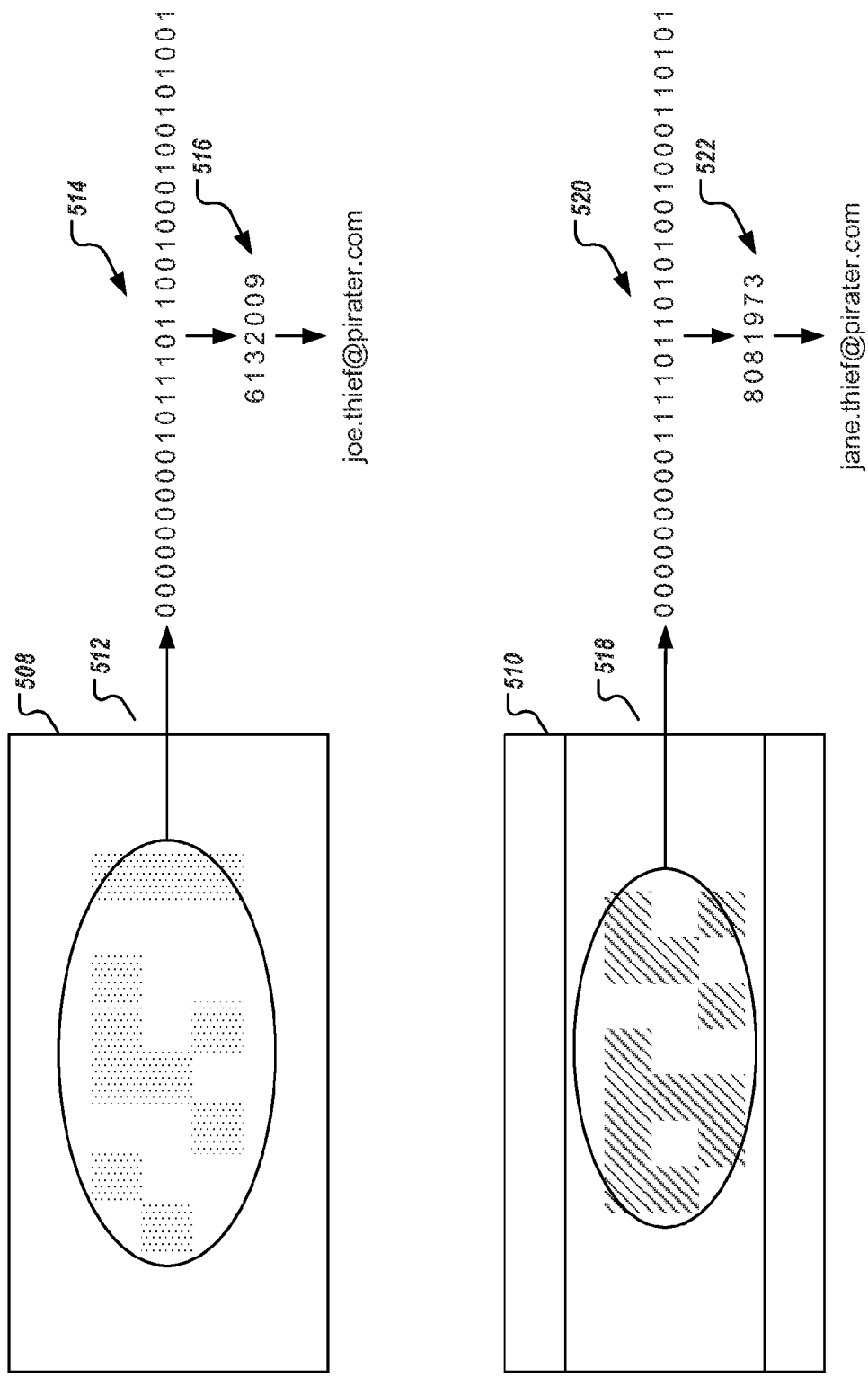

Referring now to FIGS. 5A and 5B, example detection will be described. One or more frames of an original source video can be compared to corresponding frames of one or more modified, suspect videos to determine a requestor that corresponds to each of the modified, suspect videos. An the example of FIG. 5A, a frame 502 of a first modified, suspect video and a frame 504 of a second modified, suspect video are compared to a corresponding original source frame 506 of an original digital video. As deducible from the frame 502, any visible watermarks have been removed from the first modified, suspect video and the first modified, suspect video has been scaled down by approximately one-third from the original source video. As is deducible from the frame 504, any visible watermarks have been removed from the second modified, suspect video and the second modified, suspect video has been cropped along the top and bottom edges.

Referring now to FIG. 5B, a difference frame 508 corresponds to the difference between the original frame 506 and the frame 502 of FIG. 5A, and a difference frame 510 corresponds to the difference between the original frame 506 and the frame 504 of FIG. 5A. Prior to generating the difference frame 508, the frame 502 can be re-scaled to be the same size as the original frame 506. With particular reference to the difference frame 508, a plurality of encoding patterns 512 are discernable. At least one of the encoding patterns 512 can be processed to determine an encoded unique ID 514 as a binary number. The unique ID 514 can be converted to a decimal number 516, from which the requestor, or information associated with the requestor can be determined. For example, the decimal number 516 can be processed based on the seed value corresponding to the original source video to determine a reference ID corresponding to the requestor. For example, the seed value, when provided as a decimal number, can be subtracted from the decimal number, and the resultant decimal number can be provided as the reference ID. The reference ID can be used to access a database to determine information associated with the requestor (in the illustrated example, an email address).

With particular reference to the difference frame 510, a plurality of encoding patterns 518 are discernable. Two of the encoding patters 518 are partially destroyed by the cropping. However, a plurality of the encoding patterns 518 (the center row) are still full. At least one of the encoding patterns 518 can be processed to determine an encoded unique ID 520 as a binary number. The unique ID 520 can be converted to a decimal number 522, from which the requestor, or information associated with the requestor can be determined. For example, the decimal number 522 can be processed based on the seed value corresponding to the original source video to determine a reference ID corresponding to the requestor. Using the example provided above, a 32-bit binary number can be decoded using the 8-bit seed value to provide the 4-bit unique ID. The unique ID can be used to access a database to determine information associated with the requestor (in the illustrated example, an email address).

Figure 6:
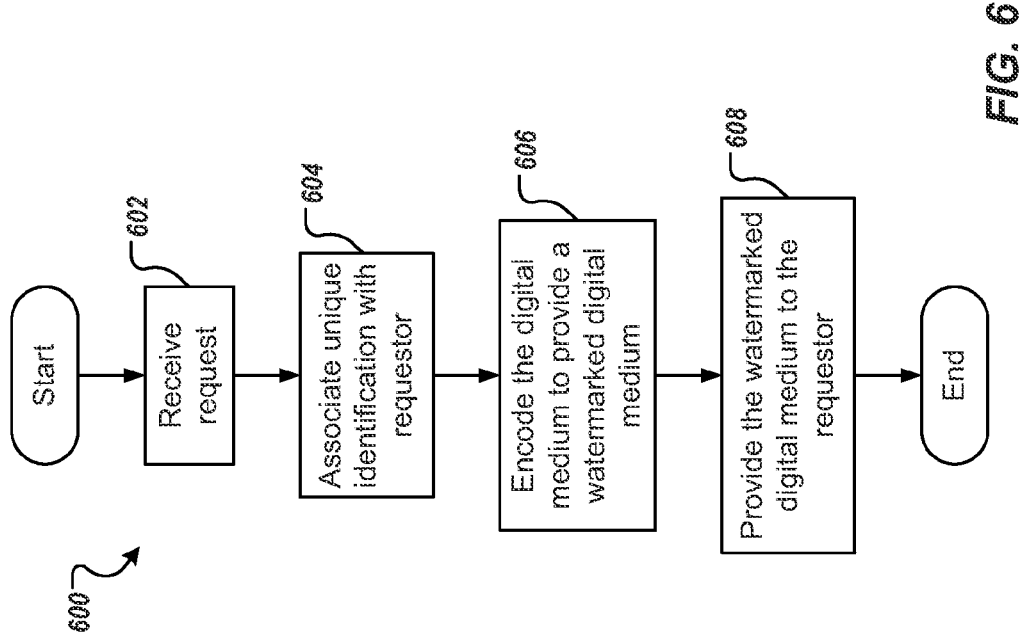
FIG. 6 depicts a flowchart of an example process for watermarking digital media in accordance with implementations of the present disclosure.

FIG. 6 is a flow diagram of an example process 600 that can be executed in accordance with implementations of the present disclosure. A request for a copy of a digital medium is received (602), the request corresponding to a requestor. For example, the requestor can include a purchaser that purchases a copy of the digital medium through a website (e.g., the website 204 of FIGS. 2A and 2B). In some implementations, the request can be received at the MCS 206 of FIGS. 2A and 2B via the website 204. A unique identification (unique ID) is associated with the requestor (604). For example, the MCS 206 can generate a unique ID based on a random seed value that is associated with an original source digital medium, of which a copy is requested. A copy of the digital medium is encoded based on the unique identification to provide a watermarked digital medium (606). The watermarked digital medium includes an invisible watermark that corresponds to the unique identification. In some implementations, the copy of the digital medium can be encoded prior to receiving the request (e.g., FIG. 2A and corresponding discussion). In some implementations, the copy of the digital medium can be encoded on-the-fly in response to receiving the request (e.g., FIG. 2B and corresponding discussion). The watermarked digital medium is provided to the requestor (608).

Figure 7:
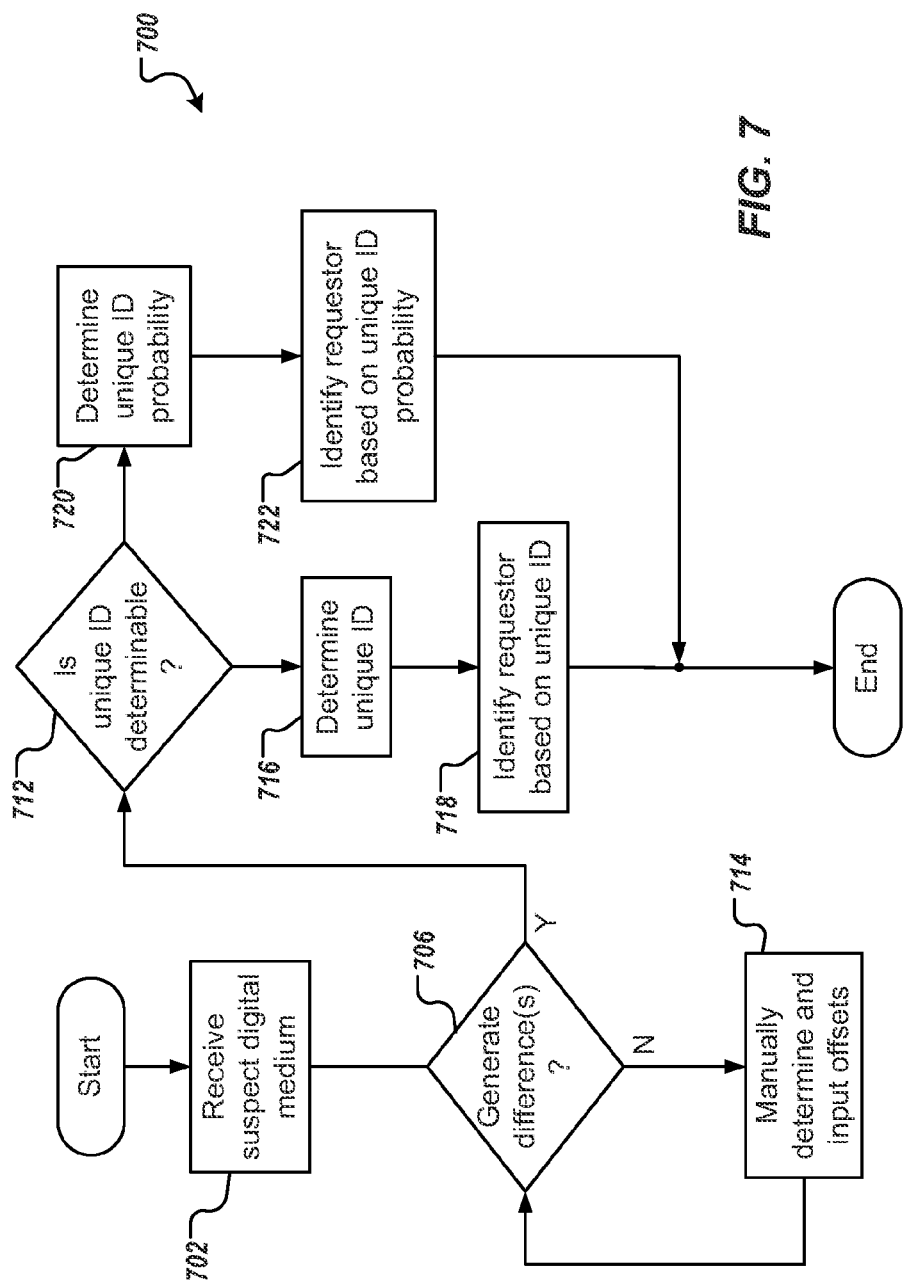
FIG. 7 depicts a flowchart of an example process for determining a unique identification from watermarked digital media in accordance with implementations of the present disclosure.

FIG. 7 is a flow diagram of an example process 700 that can be executed in accordance with implementations of the present disclosure. A copy of a suspect digital medium is received (702). For example, the suspect digital medium can include a digital video that is being openly distributed by a website. The copy of the suspect digital medium can be downloaded to a computing device (e.g., the server system 104 of FIG. 1). It is determined whether one or more difference frames can be generated based on the suspect digital medium and the original source digital medium (706). If one or more difference frames cannot be generated, one or more offsets are manually determined and are input (714). If one or more difference frames can be generated, it is determined whether the unique ID can be determined from the one or more difference frames (712). If the unique ID can be determined from the one or more difference frames, the unique ID is determined (716). The identity of the requestor corresponding to the suspect digital medium is determined based on the unique ID (718). If the unique ID cannot be determined from the one or more difference frames, a unique ID probability is determined (720), using, for example, techniques discussed herein. The identity of the requestor corresponding to the suspect digital medium is determined based on the unique ID probability (722).

Figure 8:
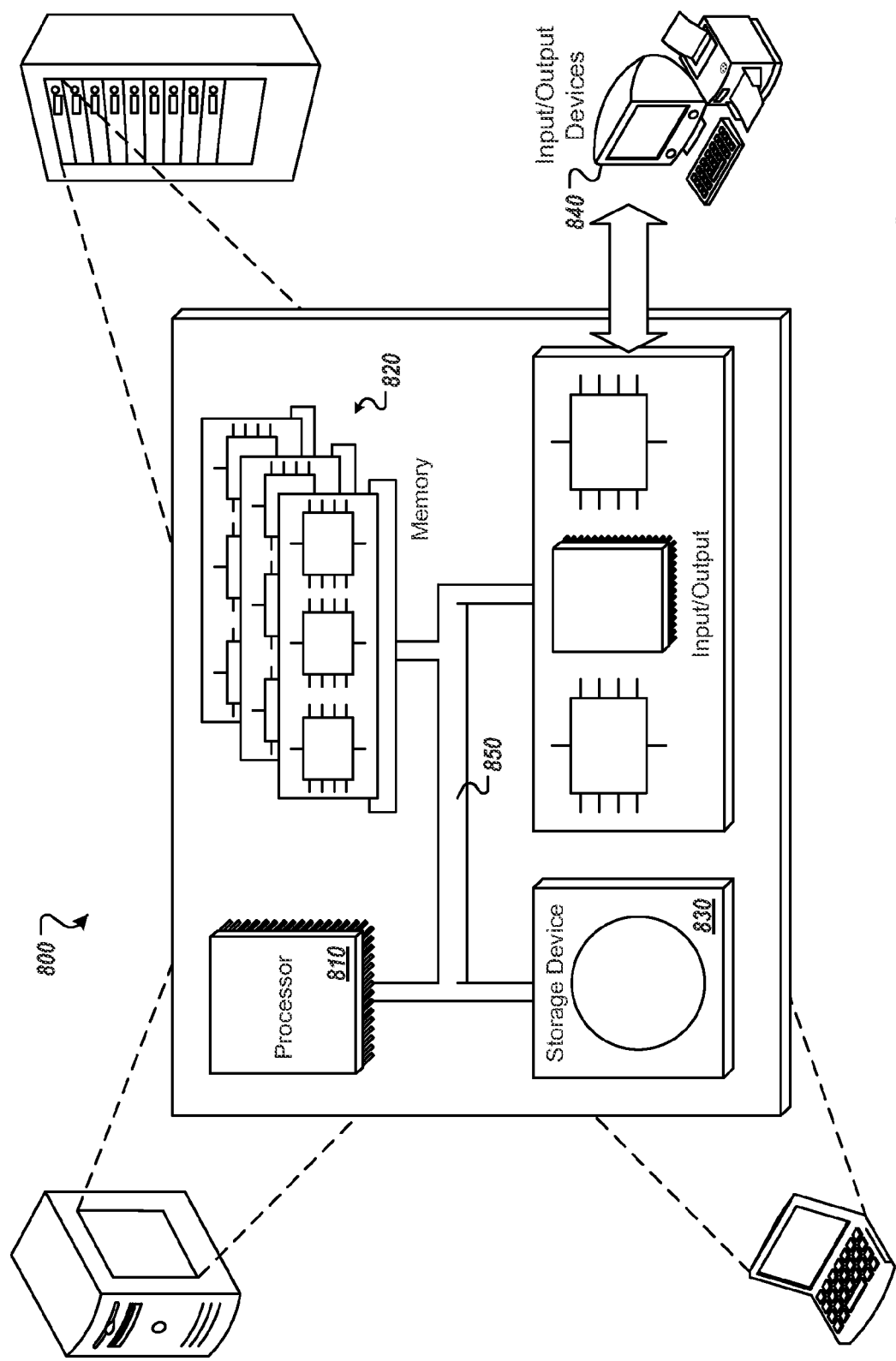
FIG. 8 is a schematic illustration of example computer systems that can be used to execute implementations of the present disclosure.

Referring now to FIG. 8, a schematic diagram of an example computing system 800 is provided. The system 800 can be used for the operations described in association with the implementations described herein. For example, the system 800 may be included in any or all of the server components discussed herein. The system 800 includes a processor 810, a memory 820, a storage device 830, and an input/output device 840. Each of the components 810, 820, 830, and 840 are interconnected using a system bus 850. The processor 810 is capable of processing instructions for execution within the system 800. In one implementation, the processor 810 is a single-threaded processor. In another implementation, the processor 810 is a multi-threaded processor. The processor 810 is capable of processing instructions stored in the memory 820 or on the storage device 830 to display graphical information for a user interface on the input/output device 840.

The memory 820 stores information within the system 800. In one implementation, the memory 820 is a computer-readable medium. In one implementation, the memory 820 is a volatile memory unit. In another implementation, the memory 820 is a non-volatile memory unit. The storage device 830 is capable of providing mass storage for the system 800. In one implementation, the storage device 830 is a computer-readable medium. In various different implementations, the storage device 830 may be a floppy disk device, a hard disk device, an optical disk device, or a tape device. The input/output device 840 provides input/output operations for the system 800. In one implementation, the input/output device 840 includes a keyboard and/or pointing device. In another implementation, the input/output device 840 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for uniquely identifying a digital medium, the method being executed by one or more processors and comprising:
   receiving, by the one or more processors, a request for the digital medium, the digital medium comprising a plurality of frames and the request corresponding to a requestor;
   associating, by the one or more processors, a unique identification with the requestor;
   encoding, by the one or more processors, at least a portion of the plurality of frames of the digital medium based on the unique identification to provide a watermarked digital medium, the watermarked digital medium comprising a watermark configured to be used to determine the unique identification and an intermittent change to one or more parameters of the watermark within at least the portion of the plurality of frames, the intermittent change comprises a variable location associated to a temporal pattern of display of the one or more parameters of the watermark and indicates the requestor, wherein the temporal pattern is associated with the watermark, the unique identification being determinable based on the temporal pattern and the temporal pattern comprises a plurality of changes to one or more parameters of the watermark; and
   providing, by the one or more processors, the watermarked digital medium to the requestor.

2. The method of claim 1, wherein the watermark comprises at least one of a visible watermark and an invisible watermark.

3. The method of claim 1, further comprising:
   receiving information associated with the requestor, wherein associating the unique identification with the requestor comprises associating the information with the unique identification; and
   storing the information and the unique identification in a persistent storage device.

4. The method of claim 1, wherein the watermark includes a representation of the unique identification.

5. The method of claim 1, wherein the unique identification comprises one or more of a decimal number, a binary number, a machine-readable code, and one or more symbols.

6. The method of claim 1, further comprising selecting the watermarked digital medium from a plurality of watermarked digital media electronically stored in a persistent storage device, the selecting being based on the unique identification.

7. The method of claim 6, further comprising:
   retrieving the watermarked digital medium from a persistent storage device in response to receiving the request; and
   determining the unique identification encoded in the watermarked digital medium, wherein the unique identification is associated with the requestor upon determining the unique identification.

8. The method of claim 1, wherein encoding occurs in response to receiving the request.

9. The method of claim 8, wherein the encoding is performed using a server of a cloud computing environment.

10. The method of claim 1, wherein the unique identification is encoded based on a seed value.

11. The method of claim 10, wherein the seed value is a unique seed value that is associated with an original source digital medium that corresponds to the digital medium.

12. The method of claim 11, wherein the digital medium comprises a digital video including a plurality of frames.

13. The method of claim 11, wherein the watermark is included in each frame of the plurality of frames.

14. The method of claim 11, wherein the watermark is included in less than all frames of the plurality of frames.

15. The method of claim 1, wherein the watermark includes a visible watermark that corresponds to the requestor.

16. The method of claim 1, wherein the watermark comprises a machine-readable code.

17. A non-transitory computer-readable storage medium coupled to one or more processors and having instructions stored thereon which, when executed by the one or more processors, cause the one or more processors to perform operations for uniquely identifying a digital medium, the operations comprising:
   receiving a request for the digital medium, the digital medium comprising a plurality of frames and the request corresponding to a requestor;
   associating a unique identification with the requestor;
   encoding at least a portion of the plurality of frames of the digital medium based on the unique identification to provide a watermarked digital medium, the watermarked digital medium comprising a watermark configured to be used to determine the unique identification and an intermittent change to one or more parameters of the watermark within at least the portion of the plurality of frames, the intermittent change comprises a variable location associated to a temporal pattern of display of the one or more parameters of the watermark and indicates the requestor, wherein the temporal pattern is associated with the watermark, the unique identification being determinable based on the temporal pattern and the temporal pattern comprises a plurality of changes to one or more parameters of the watermark; and providing the watermarked digital medium to the requestor.

18. A system, comprising:

a computing device; and a non-transitory computer-readable storage device coupled to the computing device and having instructions stored thereon which, when executed by the computing device, cause the computing device to perform operations for uniquely identifying a digital medium, the operations comprising:

receiving a request for the digital medium, the digital medium comprising a plurality of frames and the request corresponding to a requestor;

associating a unique identification with the requestor;

encoding at least a portion of the plurality of frames of the digital medium based on the unique identification to provide a watermarked digital medium, the watermarked digital medium comprising a watermark configured to be used to determine the unique identification and an intermittent change to one or more parameters of the watermark within at least the portion of the plurality of frames, the intermittent change comprises a variable location associated to a temporal pattern of display of the one or more parameters of the watermark and indicates the requestor, wherein the temporal pattern is associated with the watermark, the unique identification being determinable based on the temporal pattern and the temporal pattern comprises a plurality of changes to one or more parameters of the watermark; and providing the watermarked digital medium to the requestor.

\* \* \* \* \*